Aug. 23, 1955     C. R. LEWIS ET AL     2,715,830
SPECIMEN FOR CALIBRATING SURFACE
ROUGHNESS MEASURING APPARATUS
Filed July 12, 1952

INVENTORS.
Clayton R. Lewis.
Joseph B. Bidwell.
Arthur F. Underwood.
BY

Harness and Harris
ATTORNEYS.

United States Patent Office 2,715,830
Patented Aug. 23, 1955

2,715,830

SPECIMEN FOR CALIBRATING SURFACE ROUGHNESS MEASURING APPARATUS

Clayton R. Lewis, Birmingham, Joseph B. Bidwell, Royal Oak, and Arthur F. Underwood, Grosse Pointe, Mich.; said Bidwell and said Underwood assignors to General Motors Corporation, Detroit, Mich., a corporation of Delaware, and said Lewis assignor to Chrysler Corporation, Highland Park, Mich., a corporation of Delaware Application July 12, 1952, Serial No. 298,548

6 Claims. (Cl. 73—1)

This invention relates to an improved device for calibrating surface roughness measuring apparatus.

One of the main objects of the invention is to provide a specimen for calibrating surface roughness measuring devices in order to bring them to a standard condition so that various members of industry can conform to specified surface requirements.

A further object of the invention is to provide a comparative specimen of this type which is adapted to establish a definite set of surface roughness test values.

Another object of the invention is to provide a comparative surface roughness specimen which is particularly adapted for use in connection with prevalent surface roughness measuring devices of the type which embody a vibrating stylus.

An additional object of the invention is to provide a surface roughness specimen having a plurality of sections of different degrees of roughness which are produced in such a manner that the same stylus will fit the irregularities of the respective sections without producing an indicated error in roughness measurement.

A still further object of the invention is to provide a plurality of comparative surface roughness sections in a specimen of this kind, each of which has an extended surface composed of a plurality of pairs of facets of equal width lying in intersecting planes between which is included a uniform angle.

Another object of the invention is to provide variation in the degree of roughness of adjacent sections of the surface of the specimen by varying the widths of the facets of such adjacent sections without altering the angle therebetween.

An illustrative embodiment of the invention is shown in the accompanying drawing in which.

Figure 2:
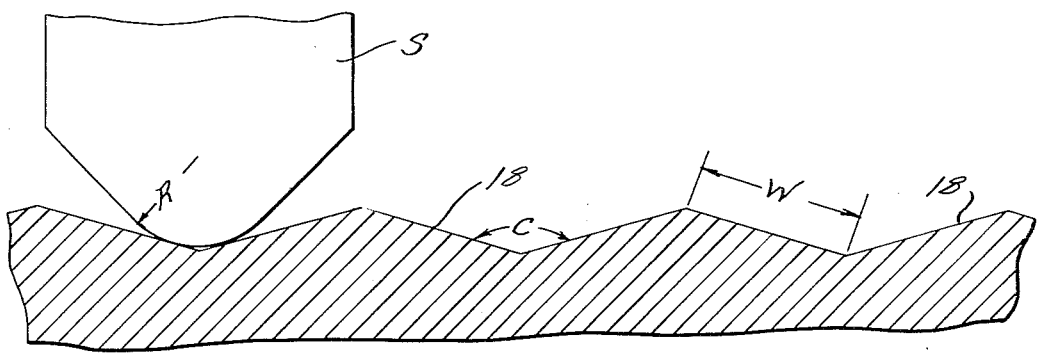
Fig. 2 is an enlarged, fragmentary, sectional elevational view taken along the line 2—2 of Fig. 1 and showing a portion of a calibrating stylus applied thereto.

In the form of the invention shown in the drawings, the specimen includes a metal block 10 on which are provided a plurality of sections 11, 12, 13, 14 and 15 which progressively increase in surface roughness from section 11 to section 15. For the purpose of illustration, an enlarged cross-sectional view of section 13 is shown in Fig. 2 to illustrate a condition of intermediate roughness and an enlarged cross-sectional view of the section 15 is shown in Fig. 3 to illustrate a surface section of maximum roughness.

Figure 1:
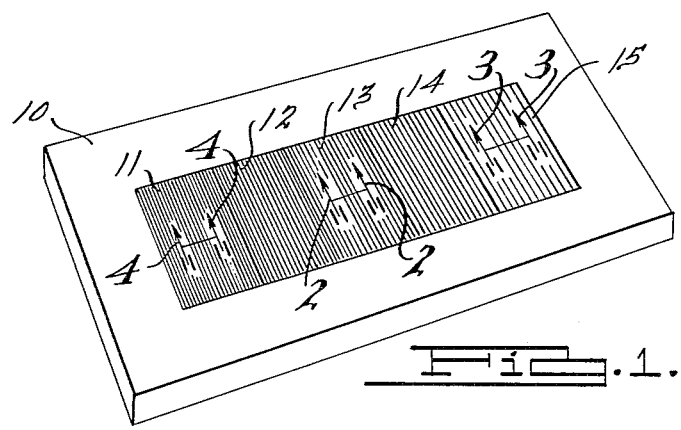
Fig. 1 is a perspective view of a roughness specimen embodying the invention.
Figure 3:
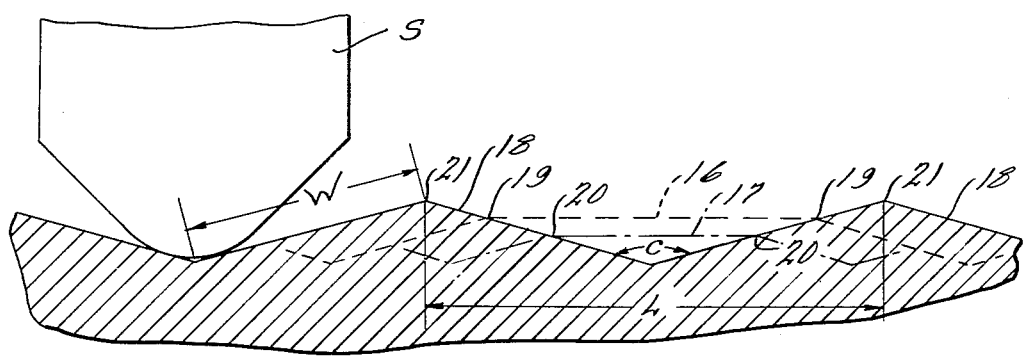
Fig. 3 is another enlarged, fragmentary, sectional elevational view taken along the line 3—3 of Fig. 1, said view also having a portion of a calibrating stylus engaged therewith.

In Fig. 3, for comparative purposes, there is illustrated by dashed lines 16 the distance between the peaks 19 of section 13 and correspondingly there is illustrated in Fig. 3 by the broken lines 17 the distance between the peaks 20 of section 11 which represents a section taken along the line 4—4 of Fig. 1.

It is apparent from the drawings that each section 11 to 15 is made up of a plurality of narrow, elongated facets 18. Adjacent facets in each section are located in intersecting planes between which is included an angle C which is uniform throughout each of the sections 11 to 15 of the specimen 10. For use of this specimen 10 with currently existing surface roughness calibrating equipment, it has been found that this angle between adjacent facets should be of from 147° to 154° but it is preferably established at substantially 150°. The variation in the degree of roughness between the respective sections 11 to 15 is established by varying the widths W of the facets of the respective sections. While the widths W of each section are uniform, the widths of the facets in different sections vary so as to produce a different distance between the peaks of each section and a different depth of groove between facets of adjacent sections. It is pointed out that the dotted lines in Fig. 3 clearly bring out this relationship by diagrammatically superimposing in one view the effective distances that would result between the peaks by varying the widths of the facets.

Currently used and most popular surface roughness measuring apparatus utilizes the vibration of a stylus which is caused to trace and follow the irregularities of the surface under examination. Such a stylus S is illustrated in Figs. 2 and 3 as comprising a round nose projection that is predetermined in curvature to closely fit the valleys between adjacent facets of the sections 11 to 15 of the specimen. The radius of curvature R of present styluses of this type has been more or less uniformly established at approximately .0005 of an inch. With such a radius of curvature at the contacting end of the stylus, it will be noted that there is uniform projection to the same extent in the valleys of the sections of different degrees of roughness when the angle between the facets is as specified. Because of the limitations of the frequency in currently used surface roughness testing machines, it has been found desirable to limit the maximum distance L between the peaks 21 of the roughest section of the specimen, namely section 15, to approximately .004 of an inch.

While at the present time the most popular type of roughness measuring apparatus utilizes a vibrating stylus, devices which operate on other principles may become popular at a future date and in that event the specimen may be used in calibrating them as readily as in calibrating the stylus type of device. By virtue of extended use throughout industry of a uniform calibrating standard, it becomes possible for various members of industry to meet the same standards of surface finish and such standards of surface finish may be readily specified in ordering products.

Although but one specific embodiment of the invention is herein shown and described, it will be understood that various changes in the sequence of operations, steps and materials employed may be made without departing from the spirit of the invention.

We claim:

1. A specimen for calibrating a surface roughness measuring device comprising a solid material having adjacent surface sections of different degrees of roughness each representing a known roughness value, the surface of each of said sections comprising a plurality of pairs of narrow elongated facets disposed in intersecting planes which each include between them an angle of substantially 150°, the widths of the facets of each section being substantially uniform and the widths of the facets of adjacent sections being different for producing said different degrees of surface roughness.

2. A specimen for calibrating a surface roughness measuring device comprising a block of solid material having adjacent surface sections of different degrees of roughness each representing a known roughness value, the surface of each of said sections comprising a plurality of pairs of narrow elongated facets disposed in intersecting planes including between them a substantially uniform angle, the widths of the facets of each section being substantially uniform throughout the section to provide a uniform degree of roughness throughout an extended area and the widths of the facets of adjacent sections being different for producing different degrees of surface roughness.

3. A specimen for calibrating a surface roughness measuring device which has a tracer stylus provided with a surface contacting end having a radius of approximately .0005 of an inch, said specimen including a block of relatively hard, solid, material having adjacent surface sections of different degrees of roughness each representing a known roughness value, the surface of each of said sections comprising a plurality of pairs of narrow elongated facets disposed in intersecting planes which include between them an angle of substantially 150°, the widths of the facets of each section being substantially uniform and the widths of the facets of adjacent sections being different for producing said different degrees of surface roughness.

4. A specimen for calibrating a surface roughness measuring device comprising a solid material having adjacent surface sections of different degrees of roughness each representing a known roughness value, the surface of each of said sections comprising a plurality of pairs of narrow elongated facets disposed in intersecting planes which include between them equal angles of from substantially 147° to 154°, the widths of the facets of each section being substantially uniform and the widths of the facets of adjacent sections being different for producing said different degrees of surface roughness.

5. A specimen for calibrating a surface roughness measuring device comprising a surface having a known roughness value, said surface comprising a plurality of pairs of narrow elongated facets disposed in intersecting planes which each include between them an angle of substantially 150°, the widths of the facets being substantially uniform.

6. A specimen for calibrating a surface roughness measuring device comprising a block of solid material having a surface representing a known roughness value, the surface comprising a plurality of pairs of narrow elongated facets disposed in intersecting planes including between them a substantially uniform angle, the widths of the facets being substantially uniform to provide a uniform degree of roughness throughout an extended area.

References Cited in the file of this patent

UNITED STATES PATENTS

| | | |
|---|---|---|
| 1,104,561 | Simmons | July 21, 1914 |
| 1,889,897 | Johansson | Dec. 6, 1932 |

FOREIGN PATENTS

| | | |
|---|---|---|
| 351,350 | Great Britain | June 25, 1931 |

OTHER REFERENCES

Surface Roughness Standards for Tactual Comparisons, Broadston, Product Engineering, November 1944, pp. 756–759.

The Proficorder, Abbott et al., Transactions of the ASME, May 1948, pp. 266–267.

Measuring Equipment, 1952 Catalog General Electric Co. 1016, p. 40.